Figure 1:
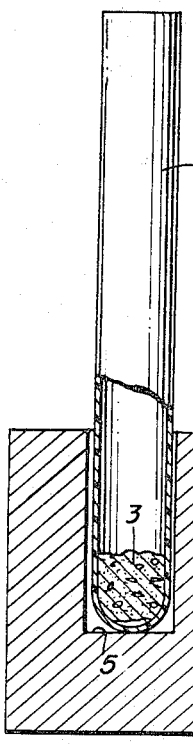

April 2, 1968   B. T. EBERLE   3,376,114
METHOD FOR MEASURING THE BINDING CAPACITY OF SERUM PROTEINS
Original Filed May 2, 1960

INVENTOR

BYRON T. EBERLE

Patented Apr. 2, 1968

3,376,114
METHOD FOR MEASURING THE BINDING
CAPACITY OF SERUM PROTEINS
Byron T. Eberle, Waukegan, Ill., assignor to Abbott
Laboratories, a corporation of Illinois
Original application May 2, 1960, Ser. No. 26,044, now
Patent No. 3,206,602, dated Sept. 14, 1965. Divided
and this application Aug. 4, 1965, Ser. No. 489,449
4 Claims. (Cl. 23—230)

This is a division of application Ser. No. 26,044, filed May 2, 1960, now Patent 3,206,602.

This invention relates to an apparatus for measuring the binding capacity of serum proteins with thyroid hormone substances and to a method for performing said measurement. In particular, the apparatus and method involves the use of a thyroid hormone substance labeled with radioactive iodine, namely, radio-L-triiodothyronine.

The measurement of the binding capacity of serum proteins with thyroid hormone substances has many useful applications, among which is the measurement of thyroid gland function. One of the early and still practiced methods is the determination of basal metabolic rate by the cumbersome and tedious procedure of measuring oxygen consumption by a subject in the resting state. The advent of radioactive isotopes provided the art with a basically new approach to the evaluation of thyroid function. In particular, radioactive iodine or $I^{131}$ provided the art with a useful tool for measuring activity of the thyroid gland. The iodine$^{131}$ uptake test is based on recording the uptake of iodine by the thyroid gland with a suitable detecting device such as a Geiger tube. A dose of iodine$^{131}$ is given to the subject and the Geiger tube is placed proximate the area of the thyroid gland. A disadvantage of the test is that any exogenous iodine detracts from the reliability of the test.

Another method which utilizes $I^{131}$ is the "conversion ratio" test which was based on the principle that iodine is converted in the thyroid gland to a thyroid hormone substance called thyroxine. When $I^{131}$ was administered to a subject, the thyroxine hormone subsequently released into the blood stream contained the iodine isotope and this iodine isotope would label the thyroxine and its subsequent protein forms which occurred after metabolic destruction thyroxine. The disadvantages of this method include larger administration of a radioactive substance and repeated visits by the subject to the laboratory.

The art recognized that an in vitro test would be highly desirable and preferred over the in vivo testing which necessarily requires administering radioactive substances to the subject. A test of this type was developed which utilized radio-L-triiodothyronine, hereinafter referred to as T-3. Radioactive iodine can be incorporated in the T-3 molecule and this resulting labeled substance can be gainfully employed in an in vitro test. T-3 is a thyroid hormone substance like thyroxine, and both thyroxine and T-3 are known to be bound by plasma proteins and by red blood cells. These substances are most strongly bound to the globulin fraction of the plasma proteins and then, to a lesser degree, to the albumin fraction of the plasma proteins. The practitioners of the art establish that these foregoing thyroid hormone substances had a greater affinity for the plasma proteins than for the red blood cells. The practitioners also discovered that the thyroxine substance was more firmly bound by either the plasma proteins or the red blood cells than was the T-3 hormone substance. The discovery of the foregoing elements enabled the practitioners to develop an in vitro test which provided the steps of adding radioactive T-3, also referred to herein as T3-$I^{131}$, to whole blood, measuring the activity of the whole blood, separating the red blood cells, determining the hematocrit and then determining the radioactivity of the red blood cells. Considerable data were collected to establish that a hyperthyroid subject would be characterized by a relatively large amount of T3-$I^{131}$ bound to the red blood cells and, conversely, a hypothyroid subject would have little T3-$I^{131}$ taken up by the red blood cells.

This foregoing in vitro test was an important advance, but the test is noted for annoying disadvantages. Many of these disadvantages arise either directly or indirectly from the hemolysis of red blood cells which adversely affects the reliability of the tests. Careful precautions cannot eliminate the possibility of hemolysis which can occur even when fresh blood is stored for short periods of time. In addition, the problem of hemolysis is heightened because a saline washing step is incorporated for the in vitro tests. It is obvious that any hemolysis will discredit the reliability of the tests because such destroyed red blood cells have taken up the T3-$I^{131}$. The tests have the additional disadvantage of requiring centrifuging to pack the red blood cells and the subsequent washing of said blood cells with isotonic saline. The number of additional steps require a longer time to practice them and also increases likelihood of error while executing the technique. Additional disadvantages characterized the method because of the necessity of incubating whole blood with T3-$I^{131}$. An incubation period is necessary in order to establish the degree of T3-$I^{131}$ uptake by the red blood cells; however, with the whole blood method, the art required incubation at body temperatures of about 37° C. This requires the use of a constant temperature bath with shaker. This incubation must also be conducted in a stoppered flask because carbon dioxide affects the T3-$I^{131}$ uptake by the red blood cells. This precautionary step is necessary because of some unknown relationship between carbon dioxide concentration in the red blood cells and uptake of T3-$I^{131}$ by said red blood cells.

It has been stated herein how the uptake by the red blood cells in the prior art method indicates the condition of thyroid function. The art has also recognized that such uptake is affected by other physiological states such as pregnancy wherein such uptake is decreased from normal levels.

It is, therefore, an object of this invention to provide an apparatus and method for efficiently determining the binding capacity of serum proteins for thyroid hormone substances.

It is another object of this invention to provide an apparatus and method which utilizes iodine$^{131}$ labeled L-triiodothyronine as a tool.

It is still another object of this invention to provide an apparatus and method for evaluating thyroid function by conducting an in vitro test with blood plasma.

It is a still further object of this invention to provide an apparatus and method which employs a resin sponge in place of red blood cells for the in vitro determination of serum protein binding with thyroid hormone substance.

In the accomplishment of the foregoing objects and other objects which will be apparent, it is now provided that a sponge having an anion exchange resin incorporated therein is combined with a container suitable for seating in a scintillation counter. A sponge with an anion exchange resin present therein is placed in a vessel to which is added blood serum and a tracer amount of T3-$I^{131}$. The thyroxine in the blood plasma is most readily taken up by the globulin and albumin fractions contained therein and, thereafter, the thyroxine and T3-$I^{131}$ not taken up by the plasma proteins are bound by the resin within the sponge. The total radioactivity of both the resin sponge and the serum is determined by placing the container vessel in a scintillation counter. After a sufficient number of counts have been made, the serum is removed from the tube and the sponge is washed with water. The washing is facilitated by squeezing the sponge with a depressor rod during the washing. Following the washing steps, the radioactivity present in the sponge is determined in the scintillation counter. The uptake of the T3-I$^{131}$ by the resin sponge is expressed as a percent of the total radioactivity in the combined serum and sponge resin.

The tracer amount of T3-I$^{131}$ can be prepared from available sources by proper dilution. The amount of activity should be a workable amount for tracer purposes. This will depend on, among other factors, the volume of blood serum used and the sensitivity of the recording and detecting instruments. This requirement is readily understood and can be readily prepared by the skilled workers in the art. A commercial source of T3-I$^{131}$ is supplied by Abbott Laboratories under the trade name of Triomet. This source contains T3-I$^{131}$ dissolved in 50% propylene glycol and has a specific activity of 20–50 millicuries per mg. of L-triiodothyronine and a concentration of 0.5–0.6 mg. T3/ml. For the purposes of the instant method, the source of T3-I$^{131}$ is diluted with isotonic saline or distilled water to a concentration of 10–120×10$^{-4}$ mcg./0.1 ml. of solution. To the container holding the 1 ml. of serum is added 0.1 ml. of the diluted T3-I$^{131}$ solution. The foregoing amount of T3-I$^{131}$ provides an adequate amount for the subsequent method, which amount also has an activity in the range of 0.01–0.5 microcurie.

The foregoing preparation is made from a recently prepared source of T3-I$^{131}$. Since I$^{131}$ has a half-life of about eight days, it is obvious that the radioactivity will diminish to low levels which will require correspondingly greater amounts of T-3 for the method. Consequently, the decay factor should be considered with preparations that have not been recently prepared. A workable tracer amount of activity in the solution would be around $3 \times 10^4$ counts per minute per 0.1 ml. of solution. This tracer amount of activity can be determined by diluting the activity of the stock solution with a volume of isotonic diluent determined from the equation:

$\mu$c./ml. of stock solution×0.133
  ×decay factor=ml. of sodium chloride solution The decay factor can be determined from the well-known formula:

$$A_2 = A_{1e} - .693 \frac{t}{T - \frac{1}{2}}$$

where $A_2$=activity to be determined, $A_1$=initial known activity, $e$=2.7183, $t$=elapsed time (from $A_1$ to $A_2$) in same units as $T-\frac{1}{2}$. $T-\frac{1}{2}$=half-life of isotope. Reference may also be made to easily available decay charts for individual isotopes.

The resin sponge employed in this test comprises a polyurethane foam of intercommunicating cell type containing 0.5 to 160, and preferably about 15 to 70, parts by weight of a strong base anion-exchange resin per 100 parts by weight of polyurethane matrix. Such a urethane foam resin is prepared by incorporating the ion-exchange resin particles in a mixture of a polyether or polyester and a polyisocyanate and then subjecting the mixture to the usual conditions for producing foams of polyurethane type. The polyester employed in such process may be an alkyd or oil-modified alkyd having a molecular weight from 300 to 8000 obtained from a dicarboxylic acid, such as adipic, phthalic, maleic, or sebacic acid, and a polyhydric alcohol, such as glycerol, ethylene glycol, diethylene glycol, trimethylolethane, and trimethylolpropane. Instead of the polyesters, there may be used polyethers having molecular weights in the range of 300 to 8000 and formed from glycols having from 2 to 10 carbon atoms. Examples of the glycols include ethylene glycol, propylene glycol, trimethylene glycol, hexamethylene glycol, octamethylene glycol, and so on. There may also be used block copolymers of ethylene oxide and propylene oxide of the formulas

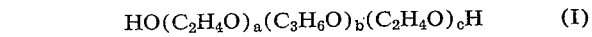

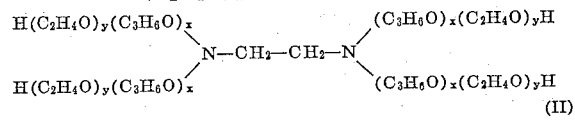

where the average values of the subscripts may be as follows:

$a$=1 to 6,
$b$=12 to 40,
$c$=1 to 6,
$x$=7 to 19, and
$y$=1 to 3.

The alkyds may also be modified with fatty acids or esters such as castor oil and in place of the dicarboxylic acids mentioned above, the so-called dimers of linolenic or linoleic acid may be used. The alkyd may be formed in the usual manner by reacting a mixture of the polyhydric alcohol, the polycarboxylic acid, and any modifying fatty acid or oil in a common reaction vessel at a temperature of 50° to 150° C. or higher.

The diisocyanate used may be one or more of the following: ethylene diisocyanate, trimethylene diisocyanate, tetramethylene diisocyanate, pentamethylene diisocyanate, propylene-1,2-diisocyanate, butylene-1,2-diisocyanate, butylene-1,3-diisocyanate, butylene-2,3-diisocyanate, and butylene-1,3-diisothiocyanate; alkylidine diisocyanates such as ethylidene diisocyanate $$(CH_3CH(NCO)_2)$$

butylidene diisocyanate $CH_3CH_2CH_2CH(NCO)_2$, cycloalkylene diisocyanates such as cyclopentylene-1,3-diisocyanate, cyclohexylene-1,2-diisocyanate, cyclohexylene-1,4-diisocyanate; aromatic diisocyanates such as m-phenylene diisocyanate, p-phenylene diisocyanate, 1-methylphenylene-2,4-diisocyanate, naphthylene - 1,4 - diisocyanates, o,o'-toluene diisocyanate; aliphatic-aromatic diisocyanates, such as xylylene-1,4-diisocyanate, xylylene-1,3-diisocyanate, 4,4'-diphenylenemethane diisocyanate, and 4,4'-diphenylenepropane diisocyanate. Toluene diisocyanates of the 2,4 and 2,6 isomeric forms are preferably employed to obtain fast reaction, but such isocyanates as diphenyl methane-4,4'-diisocyanate and p-menthane-diisocyanate may be used for a slower reaction or a more vigorous catalyst is employed. The proportion of diisocyanate may be from 6 to 85% by weight based on the weight of the alkyd or polyether. Within this broad range, it is preferred to employ from 25 to 55% of the diisocyanate on the weight of the alkyd or polyether.

While it is not essential that a catalyst be present, a tertiary amine may be employed to advantage where it is desired to shorten the time of reaction. As much as 2 to 10% of such a tertiary amine may be employed based on the weight of the diisocyanate. Examples of the tertiary amines that are thus useful include the N-alkyl morpholines in which the alkyl substituent has from 1 to 18 carbon atoms of which N-methyl morpholine is typical, triethylamine, triethanolamine, dimethylethanolamine, N,N-diethylcyclohexylamine, and 1,4 - diazabicyclo[2.2.2]octane.

The polyurethanes may be obtained merely by mixing the alkyd or polyether with the diisocyanate and water with or without the catalyst at normal room temperature up to 60° C. The time required to effect the reaction and complete it may vary from 15 seconds to several hours depending upon whether a catalyst is employed, the activity of the diisocyanate, and the temperature. The mixture of the several reactants with or without a catalyst may be placed in a mold in which it is formed into the desired shape during the completion of the reaction. Likewise, a mixture of the reactants may be extruded continuously and, for this purpose, the several ingredients and the temperature may be controlled so as to allow adequate time for the passage of the mixture from the point of mixing into the extrusion channel before setting occurs.

In order to stabilize the foam, an emulsifier may be employed. The amount of emulsifier may be from 0.5 to 5% on the weight of alkyd and any of the usual emulsifiers may be employed. Non-ionic emulsifiers are preferred, such as the ethylene oxide condensates derived from vegetable oils, such as castor oils, from alcohols, organic acids, phenols, and hydroxyesters.

In addition to the emulsifier, there is incorporated from 1 to 5% of water based on the weight of polyester or polyether in order to develop the necessary gas for formation of the cellular mass. In making the cellular products, the various ingredients may be mixed in different ways, depending on the resin/polyisocyanate system involved. When it is desirable to manufacture the cellular ion-exchange products of the present invention from polyesters on conventional continuous production from machines, the ion-exchanger resin is first mixed into the polyester or polyether. If the mix exhibits too high a viscosity for pumping on such machines (e.g., if viscosity is appreciably above 25,000 centipoises when measured on a Brookfield viscometer), a viscosity-reducing aid may be added in the form of a plasticizer or other viscosity-reducing liquids compatible with the foam system. The polyester (or polyether)/ion-exchange resin mixture (with any necessary plasticizer such as tris($\beta$-chloroethyl)phosphate or tricresyl phosphate) is in turn mixed with the diisocyanate and an activator mixture consisting of water and catalyst, and where necessary, an emulsifier. In order to produce the desired ion-exchange products by simultaneous mixing, the polyester (or polyether)/ion-exchange resin mixture is supplied to the mixing head from one line in the machine, the diisocyanate from another, the activator from still another separate line.

The foregoing anion resin polyurethane foam sponges can assume multiple forms, but a convenient and preferred embodiment prescribes a cylindrical plug which can be seated neatly in the bttom of a container adapted for placement in the well crystal or on top of a probe crystal of conventional scintillation counters. The actual physical dimensions of a cylindrical plug of resin sponge will, of course, be determined by the volume of serum used and by the size of the container which, in turn, will depend on the size of the seating well in the particular well-scintillation counter available to the practitioner. It is desirable that once a resin sponge is prepared, a plug of standard size be employed with a standard volume of serum in establishing the appropriate ranges of $T3I^{131}$ uptake for normal and other subjects undergoing the particular study. Various modifications, of course, can be made in the type of resin and the content thereof in the polyurethane foam; also, in the make up and characteristics of the sponge. Modifications can also be made in the volumes of serum and amounts of tracer material therein. Such variations will not detract from the operability of the method, but to attain the greatest advantage from the practice of the method, a selected volume of serum and a selected size of a particularly prepared resin sponge should be adapted as standards.

FIGURE 1 is an embodiment of the invention.

Figure 2:
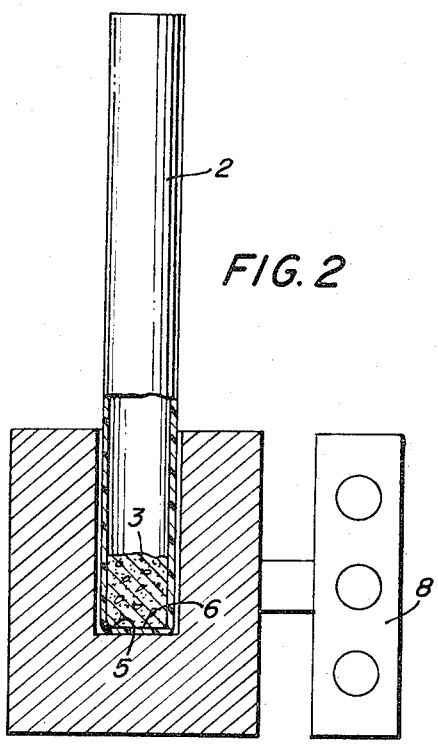

FIGURE 2 presents a modification of the container of FIGURE 1.

Figure 3:
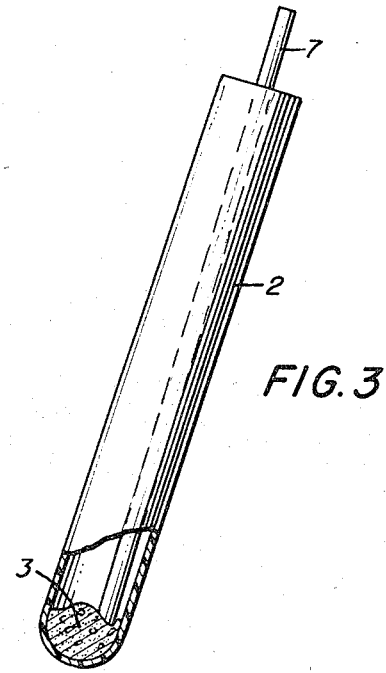

FIGURE 3 illustrates a sponge partially collapsed by a depressor rod.

An embodiment of the vessel and sponge plug is illustrated in FIGURE 1 wherein the vessel tube is shown seated in the well 5 of the well-scintillation counter schematically represented as 8. The essential relationships of the plug 3 and vessel 2 are shown in the drawing. This relationship includes the proper seating of the container tube in the well 5 and the dimensions of the plug 3 such that said plug is well within the crystal surfaces of the well 5. Another embodiment, not shown, provides a holder for the vessel 2 above a probe crystal in scintillation counter.

FIGURE 2 presents a modification in that the container 2 has a flat bottom 6. This embodiment of the container is preferred in the practice of the method because the resin sponge 3 rests directly on the flat portion 6 and thereby is closer to the sensitive area of the scintillation phosphors or crystal. This results in a better counting efficiency. This particular embodiment also has a further advantage in that the resin sponge tends to remain in a fixed position within the container tube. This will be better understood by considering the subsequent step of squeezing the resin sponge with a depressor rod during the washing steps. Following the recording of the count for both the serum and the resin sponge, the serum is removed and the sponge is washed with distilled water to remove any $T3I^{131}$ which has not been bound to the resin sponge. To assure an effective washing, the sponge is squeezed with the aid of a depressor rod to force out the water absorbed therein. FIGURE 3 illustrates the resin sponge 3 in the vessel 2 partially collapsed by the depressor rod 7.

This squeezing step could possibly result in displacing the characteristic cylindrical volume of the resin sponge by wedging said sponge in the rounded bottom portion of the vessel. It will be obvious that such displacement will alter the geometry of the resin sponge within the well of the well-scintillation counter. This altered geometry means that various distances from respective points on the surface of the sponge to the scintillation crystal have been changed by altering the configuration of the resin sponge. The likelihood of this undesirable occurrence is reduced with the flat-bottomed container illustrated in FIGURE 2.

The resilient nature of the polyurethane foam sponge contributes materially to the success of the method because it allows the washing step to be more efficient. As described hereinbefore, the radioactivity of the sponge itself must be measured so that an accurate percentage of the total radioactivity in the sponge and serum can be calculated. The percentage figure will be more meaningful if the radioactivity within the sponge truly represents the activity of the $T3-I^{131}$ bound to the resin sponge. Any radioactivity arising from $T3-I^{131}$ bound to serum proteins or not bound to either the resin sponge or serum proteins should be eliminated from the radioactive count. This radioactive component is best eliminated by the efficient washing and squeezing of the sponge to facilitate the washing step. In practice, it has been found that three or four washing steps are sufficient in order to obtain a meaningful radioactive determination of the $T3-I^{131}$ bound to the resin sponge. It is apparent that these few simple washing steps would not attain their desired function if it were not for the resilient character of the polyurethane foam.

The following examples are presented to illustrate the operation of the apparatus in determining the percentage uptake of $T3-I^{131}$ in the practice of the method. It is obviously intended that such illustrations are not intended to represent exclusive embodiments or steps practiced in exact execution.

Example I

To 500 grams of a polyether glycol having a molecular weight of approximately 3500 and an hydroxyl number of 65 was added 300 grams of a strong base quaternary ammonium anion-exchange resin in the form of the chloride salt prepared by the process disclosed in U.S. Patent 2,591,573 and having an anion-exchange capacity of about 4 milliequivalents per gram of dry resin. This mixture was pumped to a mixing chamber on a foam machine. From a separate reservoir, 174 grams of an 80:20 weight ratio mixture of the 2,4 and 2,6 toluene diisocyanate isomers was pumped to the mixing chamber. From a third reservoir, 13.5 grams of a 28.6% aqueous solution of triethylenediamine was pumped into the chamber. The three components were continuously mixed at a speed of 2500 r.p.m. and ejected through an orifice of the mixing chamber into a mold of the dimensions 12" x 18" x 8". The foam had a density of 2.3 lbs. per cubic foot and an ion-exchange resin concentration equivalent to 29.5% of the total foam weight.

Example II

A round-bottomed polyethylene container conforming to the shape of a conventional test tube suitable for seating in a well of a scintillation counter is used to receive a polyurethane foam-anion resin sponge prepared by the process of Example I. The sponge is cylindrical in shape and has a diameter of 1.2 cm. and a length of 1.2 cm. Several milliliters of whole blood are removed from a subject and placed in a separate test tube. The red blood cells are separated from the blood by centrifugation and 1 ml. of serum is decanted into the polyethylene container. To this serum is added a tracer amount ($10–120 \times 10^{-4}$ mcg./0.1 ml.) of radioactive L-triiodothyronine or T3-$I^{131}$ having an activity of about 0.20–0.25 microcurie.

The combined serum, resin sponge and tracer amounts of T3-$I^{131}$ are allowed to incubate at room temperature with periodic mixing for about two hours. Thereafter, the container is placed in the well of a scintillation counter so that the crystal, shaped like a well, surrounds the resin sponge within the container. The counts are recorded and correction is made for background. The container is removed and the serum is decanted from the container after which distilled water is washed into the container, and the sponge is depressed several times in a squeezing operation to assure good washing. The distilled water is emptied from the container and the washing step is completed with an additional amount of distilled water. The procedure is repeated and a third washing step is performed. The container is then returned to the well of the scintillation counter and the counts of the radioactivity residing in the sponge are recorded with correction for background as in the previous recording. The percent uptake by the resin sponge of T3-$I^{131}$ is determined by the following equation:

$$T3-1^{131} = \frac{\text{Residual activity}}{\text{Initial activity}} \times 100$$

where the initial activity is the radioactivity as determined by the counts of the serum and resin sponge and the residual activity is the radioactivity residing only on the sponge after the foregoing washing steps. The percent figures provide an index of percent uptake of T3-$I^{131}$ by the resin sponge.

Example III

The steps of Example II were followed to determine the percent uptake of T3-$I^{131}$ by a resin sponge prepared according to the procedures of Example I. This uptake was determined with sera withdrawn from a number of known normal or euthyroid subjects, known hyperthyroid subjects, known hypothyroid subjects and known pregnancies. The following table presents the average percent figures for the respective subjects with the standard deviations. The statistical probability of observing a difference between the control and other groups as large as those observed, when there is in fact no difference, is 0.001 or one out of one thousand.

| Subjects | Number | Average Uptake With S.D. |
| --- | --- | --- |
| Controls | 54 | 30.5±2.9 |
| Hyperthyroids | 32 | 44.2±6.0 |
| Hypothyroids | 14 | 25.3±2.6 |
| Pregnancies | 11 | 21.6 |

Example IV

A polyethylene vessel having annular side walls and a flat bottom as illustrated in FIGURE 2 of the drawings is used to accept 0.1 ml. of a diluted solution of T3-$I^{131}$, prepared as described in Example II. To the vessel is then added 1 ml. of serum followed by a resin sponge plug of the type and size described in Example II. The combined vessel, resin sponge, serum and T3-$I^{131}$ are allowed to incubate at room temperature for about two hours, and the radioactivity of the combined serum and sponge is determined as in Example I. The serum is removed and the sponge is washed with distilled water three times according to the procedure of Example I; and the residual activity remaining within the sponge is recorded.

The method described in the foregoing examples essentially provides for the steps of separating red blood cells from whole blood and adding a tracer amount of T3-$I^{131}$ to the resulting serum. The combined serum and T3-$I^{131}$ are incubated and placed in a vessel suitable for seating in the well of a scintillation counter. To the vessel is preferably added a resin sponge plug having dimensions which will allow said plug to be surrounded by the phosphor or crystal of the scintillation counter. The next step provides that the total radioactivity or initial activity of the combined serum and sponge is counted and recorded. Thereafter, the serum is withdrawn and the sponge is washed a few times with distilled water with the addition of a squeezing operation on the sponge with a depressor such as a glass or wooden rod. The activity taken up by the sponge or the residual activity is then determined in the scintillation counter. The ratio of residual activity to the initial activity is expressed as a percentage figure to indicate uptake by the resin sponge of T3-$I^{131}$.

Description of the apparatus and method in the foregoing examples provides that the T3-$I^{131}$ is mixed, from an available source, with the serum in the vessel. It is intended that other procedures may be used to introduce the T3-$I^{131}$ into the vessel. One of the alternative procedures could provide adsorption of a layer of the radioactive material onto the interior side walls of the vessel. This method of adding the radioactive material to the vessel provides dissolving the T3-$I^{131}$ in a volatile solvent such as n-butyl alcohol, then adding the solution to the vessel, allowing the volatile solvent to evaporate with the aid of mild heat or a stream of air over the vessel opening. The complete evaporation of the volatile solvent will leave a thin layer of the radioactive material adhering to the side walls of the vessel. Small volumes of aqueous solutions can also be used to wet the side walls; the subsequent evaporation will also leave a dry layer of the isotope. The amount of activity to be incorporated on the vessel wall is determined by the same considerations which are instrumental in determining the tracer amount of activity in the foregoing examples. A workable activity range is about .01–0.5 microcurie. The foregoing manner of introducing the radioactive material into the vessel can be understood and practiced more easily by referring to U.S. 2,911,338 wherein the method of adsorbing radioactive substances on the surface walls of capsules is taught.

Another way to introduce T3-$I^{131}$ into the vessel is by means of an inert carrier such as paper, cotton and the like. The carrier can be withdrawn from the vessel after the radioactivity has been removed therefrom. The inert carrier can be conveniently fashioned to conform to a long strip or be affixed to a swab stick or the like in order to facilitate handling thereof. It is additionally provided that a tracer amount of T3-$I^{131}$ can be placed directly on the resin sponge by contacting the resin sponge with a solution of T3-$I^{131}$ and retaining said isotope on the resin sponge after removal of the solvent.

In the immediately foregoing embodiments it is therefore provided that the vessel will already contain the tracer amount of radioactive substance and the practitioner need only add the serum to the resin sponge within the vessel to practice the method.

The novel apparatus in this invention results in advantages because of the co-action of the vessel and the resin sponge contained therein. The vessel is formed in the shape of a test tube so that it can be seated within the crystal well or in a holder on top of a probe crystal of a scintilation counter. As described hereinbefore, a preferred embodiment prescribes that the vessel has a flat bottom rather than a round bottom in order to secure the resulting advantages of geometry and proximity of the resin sponge to the phosphor; and the fixed position of the resin sponge within the vessel. The vessel can be constructed of any material which is adapted for operation in a scintillation counter. It is obvious that such material should not unduly adsorb the labeled material thereon, thus hampering the subsequent washing step, nor should it unduly interfere with transmission of the radioactive rays to the sensitive crystal. Among such materials are glass and the thermoplastic materials made by injection molding such as polyethylene, polypropylene, polystyrene and the like.

The scintillation counters employed in the process comprise the detector unit and the required ancillary units which consist of an extra high tension unit and an amplifying, discriminating and scaling unit. The foregoing units which comprise the scintillation counter are well known to the skilled members of the art. The scintillation counters are particularly adapted for the instant method because of the well and because $I^{131}$ emits medium energy gamma rays which the scintillation counter is well adapted to receive and to count. The art contains many standard and conventional texts and statements which describe or illustrate both the principle and the operation of the scintillation counter. Among many other publications, the practitioner may consult the text, Isotopic Tracers, by Francis Mulligan and Wormall, University of London, The Athlone Press, 1959, pp. 142 et. seq.

Others may practice the invention in any of the numerous ways which will be suggested by this disclosure to one skilled in the art. All such practice of the invention is considered to be a part hereof provided it falls within the scope of the appended claims.

I claim:

1. A method for measuring the binding capacity of serum proteins with thyroid hormone substances which comprises the steps of mixing a tracer amount of L-triiodothyronine labeled with radioactive iodine with blood serum, placing in intimate contact with such mixture a resin sponge comprising a polyurethane foam of intercommunicating cell type containing 0.5 to 160 parts by weight of a strong base anion-exchange resin per 100 parts by weight of polyurethane matix, incubating the mixture and said resin sponge, measuring with suitable detecting means the initial radioactivity of the combined mixture and the resin sponge, removing the serum, washing the resin sponge with water, and measuring with suitable detecting means the residual radioactivity in the sponge.

2. A method for measuring the binding capacity of serum proteins with thyroid hormone substances which comprises the steps of mixing a tracer amount of L-triiodothyronine labeled with radioactive iodine with blood serum, placing in intimate contact with such mixture a resin sponge comprising a polyurethane foam of intercommunicating cell type containing 0.5 to 160 parts by weight of a strong base anion-exchange resin per 100 parts by weight of polyurethane matrix, incubating the mixture and the resin sponge at room temperature, measuring with suitable detecting means the initial radioactivity of the combined mixture and said resin sponge, removing the serum, adding water to the resin sponge, squeezing the resin sponge in the water, removing the water and measuring with suitable detecting means the residual radioactivity in the resin sponge.

3. A method for measuring the binding capacity of serum proteins with thyroid hormone substances which comprises the steps of mixing a tracer amount of L-triiodothyronine labeled with radioactive iodine with blood serum, placing in intimate contact with such mixture a resin sponge comprising a polyurethane foam of intercommunicating cell type containing 15 to 70 parts by weight of a strong base anion-exchange resin per 100 parts by weight of polyurethane matrix, incubating the mixture and the resin sponge at room temperature for about two hours, measuring with suitable detecting means the initial radioactivity of the combined mixture and said resin sponge, removing the resin sponge from the mixture, washing the resin sponge with water 3–4 times, squeezing the resin sponge in the water, removing the resin sponge from the water and measuring with suitable detecting means the residual radioactivity in the resin sponge.

4. A method for measuring the binding capacity of serum proteins with thyroid hormone substances which comprises the steps of mixing $10–120 \times 10^{-4}$ micrograms of L-triiodothyronine labeled with radioactive iodine and having an activity of 0.02–0.25 microcurie to about 1 ml. of blood serum, placing in intimate contact with such mixture a resin sponge comprising a polyurethane foam of intercommunicating cell type containing about 30 parts by weight of a strong base quaternary ammonium anion-exchange resin per 100 parts by weight of polyurethane matrix, incubating the mixture and the resin sponge at room temperature for about two hours, measuring with suitable detecting means the initial radioactivity of the combined mixture and said resin sponge, removing the resin sponge from the serum, washing the resin sponge with water 3–4 times, squeezing the sponge in water, removing the resin sponge from the water, and measuring with suitable detecting means the residual radioactivity in the resin sponge.

References Cited

Mitchell, "Resin Uptake of Radiothyroxine in Sera From Non-Pregnant . . . Women, . . ." Journal of Clinical Endoctrinology and Metabolism, vol. 18, pp. 1437–1439 (1958).

MORRIS O. WOLK, *Primary Examiner.*

R. E. SERWIN, *Assistant Examiner.*